UNITED STATES PATENT OFFICE.

THOMAS B. ALLEN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

MANUFACTURE OF REFRACTORY ARTICLES.

1,197,327.      Specification of Letters Patent.      Patented Sept. 5, 1916.

No Drawing.      Application filed November 29, 1913. Serial No. 803,698.

*To all whom it may concern:*

Be it known that I, THOMAS B. ALLEN, a subject of the King of Great Britain, and a resident of Niagara Falls, in the county of Niagara and State of New York, have invented a new and useful Improvement in the Manufacture of Refractory Articles, of which the following is a full, clear, and exact description.

My invention relates to the manufacture of glazed refractory articles, and is designed to provide a new and improved method of producing such articles, as well as a new and improved glazed article.

Heretofore in the manufacture of refractory blocks or articles in order to protect the surface against the action of furnace gases, slags, products of combustion, etc., it has been customary to glaze them by dipping, painting, or otherwise applying the glaze after the article was formed. It has been found, however, that with such articles the glaze is disrupted under alternate heating and cooling on account of the different coefficients of expansion and contraction as between that of the glaze and that of the refractory body. I have discovered that I can greatly improve these glazed articles and reduce or remove the liability to disrupting the glaze by incorporating the glazing material in the refractory mass before shaping; and subsequently heating to form the glaze on the surface. The glaze thus formed being held in the interstices at the surface of the article, adheres very strongly and gives better articles than heretofore produced.

I will now describe my invention in detail as applying to the manufacture of silicon carbid refractory articles.

I preferably take 90 parts by weight of silicon carbid of a proper degree of fineness, preferably of such sizes as to give the maximum density to the finished article, and 10 parts by weight of plastic fire clay, preferably using a plastic kaolin or ball clay. To this mixture, I add 5% by weight of a saturated solution of ferric chlorid and 5% by weight of a saturated solution of common salt. Sufficient water is added to give the mixture a suitable consistency, and it is then shaped to the desired form by pressing, tamping, or otherwise, and allowed to dry. The article is then placed in a kiln and heated to a temperature of 1300 degrees centigrade, or more.

During the drying and heating of the article, the soluble salts are drawn to the surface by capillary action and are partially volatilized. Sufficient glazing material, however, remains on the surface and in the interstices at the surface to combine with the clay. This increased proportion of fluxing ingredients at the surface, due to the interaction of the kiln atmosphere, the silicon carbid or clay, and the decomposition of the chlorids to oxids, forms a glaze under the vitrifying temperature which fills the interstices between the silicon carbid grains at the outside of the article, thus reducing porosity and gas permeability and causing the article to become more highly resistant to the decomposing action of the furnace gases, furnace charges, slags, etc.

The advantages of my invention result from mixing the glazed material with the mixture forming the article, thus giving a very strong bond between the glaze that forms at the surface and the material of the article itself. Rapid destruction of the glaze is thus avoided and a more lasting and better article afforded.

Changes may be made in the material of the glaze, the material forming the refractory article, etc., without departing from my invention.

I claim:

In the manufacture of refractory silicon carbid articles, the steps consisting in incorporating with a mixture containing silicon carbid and clay, a solution of ferric chlorid, shaping the article, firing it at a temperature sufficient to decompose the ferric chlorid, and vitrifying the resulting oxid of iron with the clay at or adjacent to the surface.

In testimony whereof, I have hereunto set my hand.

THOS. B. ALLEN.

Witnesses:
    C. H. GREENWOOD,
    W. DIEMER.